United States Patent
Dodd

(10) Patent No.: US 7,469,316 B2
(45) Date of Patent: Dec. 23, 2008

(54) BUFFERED WRITES AND MEMORY PAGE CONTROL

(75) Inventor: James M. Dodd, Shingle Springs, CA (US)

(73) Assignee: Intel Corporation, Santa Clara, CA (US)

(*) Notice: Subject to any disclaimer, the term of this patent is extended or adjusted under 35 U.S.C. 154(b) by 913 days.

(21) Appl. No.: 10/364,280

(22) Filed: Feb. 10, 2003

(65) Prior Publication Data

US 2004/0158677 A1  Aug. 12, 2004

(51) Int. Cl.
*G06F 12/00* (2006.01)
*G06F 13/00* (2006.01)

(52) U.S. Cl. .................... 711/118; 711/100; 711/154

(58) Field of Classification Search ............... 711/118, 711/135, 143, 104, 105, 154, 3, 100, 200; 710/310

See application file for complete search history.

(56) References Cited

U.S. PATENT DOCUMENTS

| | | | |
|---|---|---|---|
| 4,354,232 A | 10/1982 | Ryan et al. | |
| 5,603,010 A | 2/1997 | Dodd et al. | |
| 5,666,494 A | 9/1997 | Mote et al. | |
| 5,953,743 A | 9/1999 | Jeddeloh et al. | |
| 6,128,716 A | 10/2000 | Biggs | |
| 6,219,765 B1 | 4/2001 | Jeddeloh | |
| 6,269,433 B1 | 7/2001 | Jones et al. | |
| 6,363,460 B1 * | 3/2002 | Jeddeloh | 711/154 |
| 6,400,631 B1 | 6/2002 | Williams et al. | |
| 6,505,282 B1 | 1/2003 | Langendorf et al. | |
| 6,507,530 B1 | 1/2003 | Williams et al. | |
| 6,553,449 B1 | 4/2003 | Dodd et al. | |
| 6,556,952 B1 * | 4/2003 | Magro | 702/183 |
| 6,697,888 B1 | 2/2004 | Halbert et al. | |
| 6,725,349 B2 | 4/2004 | Langendorf et al. | |
| 6,742,098 B1 | 5/2004 | Halbert et al. | |
| 6,766,385 B2 | 7/2004 | Dodd et al. | |
| 2001/0013082 A1 * | 8/2001 | Jeddeloh | 711/105 |
| 2003/0061459 A1 * | 3/2003 | Aboulenein et al. | 711/167 |
| 2003/0182513 A1 | 9/2003 | Dodd et al. | |
| 2004/0015645 A1 | 1/2004 | Dodd et al. | |
| 2004/0042320 A1 | 3/2004 | Dodd et al. | |
| 2004/0044832 A1 | 3/2004 | Dodd | |
| 2004/0088451 A1 | 5/2004 | Dodd et al. | |
| 2004/0243768 A1 | 12/2004 | Dodd et al. | |

FOREIGN PATENT DOCUMENTS

CN  1180430 A  4/1998

OTHER PUBLICATIONS

Pending U.S. Appl. No. 10/676,781, p. 16947, entitled: "Adaptive Page Management", filed on Sep. 30, 2003.

(Continued)

*Primary Examiner*—Tuan V. Thai
(74) *Attorney, Agent, or Firm*—Ling Hong

(57) ABSTRACT

Machine-readable media, methods, and apparatus are described to issue transactions to a memory. In some embodiments, a memory controller may select pending transactions based upon selection criteria and may issue the selected transactions to memory. Further, the memory controller may close a page of the memory accessed by a write transaction in response to determining that the write transaction is the last write transaction of a series of one or more write transactions.

29 Claims, 3 Drawing Sheets

OTHER PUBLICATIONS

Pending U.S. Appl. No. 09/664,981, p. 2035, entitled: "Device and Apparatus for Improving Performance of Low-Cost Memory Devices", filed on Sep. 18, 2000.

Pending U.S. Appl. No. 09/664,516, p. 9606, entitled: "System and Method for Controlling Data Flow Direction in a Memory System", filed on Sep. 29, 2000.

Pending U.S. Appl. No. 09/677,137, p. 9616, entitled: "Method and Apparatus for Managing Power in a Memory Component While Maintaining High Performance", filed on Sep. 29, 2000.

Pending U.S. Appl. No. 09/666,489, p. 9836, entitled: "Buffering Data Transfer Between a Chipset and Memory Modules", filed Sep. 18, 2000.

Zhao Zhang et al: A Permutation-Based Page Interleaving Scheme to Reduce Row-Buffer Conflicts and Exploit Data Locality; Micro-33. Proceedings of the 33rd. annual ACM/IEEE Int'l symposium on Microarchitecutre, Monterey, CA, Dec. 10-13, 2000. IEEE Comp. Soc, US, XP010528873; ISBN: 0-7695-0924-X; pp. 32-41.

Int'l Application No. PCT/US2004/000032 Int'l Search Report & Written Opinion dated Apr. 11, 2006.

* cited by examiner

BUFFERED WRITES AND MEMORY PAGE CONTROL

BACKGROUND

Computing devices typically comprise a processor, memory, and a memory controller to provide the processor as well as other components of the computing device with access to the memory. The performance of such computing devices is strongly influenced by the memory latency of the computing device. In general, the "memory read latency" is the length of time between when the processor requests the memory controller to retrieve data from the memory and when the memory controller provides the processor with the requested data. Similarly, the "memory write latency" is generally the length of time between when the processor requests the memory controller to write data to the memory and when the memory controller indicates to the processor that the data has been or will be written to the memory.

To reduce the effect of memory latency on the computing device, memory controllers typically buffer write transactions of the processor and later write the data of the transaction to memory at a more appropriate time. As far as the processor is concerned, the write transaction is complete once buffered by the memory controller. The processor, therefore, may continue without waiting for the data of the write transaction to be actually written to memory. Conversely, read transactions are not complete from the standpoint of the processor until the data is read from memory and returned to the processor. Accordingly, performance of a computing device is typically more dependent upon read latency than write latency.

Moreover, memory latency is influenced by the proportion of page-hit, page-miss, and page-empty transactions encountered. Computing devices typical comprise hierarchal memory arrangements in which memory is arranged in channels, ranks, banks, pages, and columns. In particular, each channel may comprise one or more ranks, each rank may comprise one or more banks, and each bank may comprise one or more pages. Further, each page may comprise one or more columns. When accessing memory, the memory controller typically opens a page of the memory and then accesses one or more columns of the opened page. For a page-hit access, the memory controller may leave a page open after accessing a column of the page for a previous memory request and may access a different column of the open page. For a page-miss access, the memory controller may close an open page of a bank, may open another page of the same bank, and may access a column of the newly opened page. A page-miss access generally has about three times the latency as a page-hit access. For a page-empty access, the memory controller may open a closed page of a bank, and may access a column of the newly opened page for the memory transaction. A page-empty access generally has about twice the latency as a page-hit access.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques that attempt to decrease overall memory latency by intelligently closing pages of the memory. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM);. magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
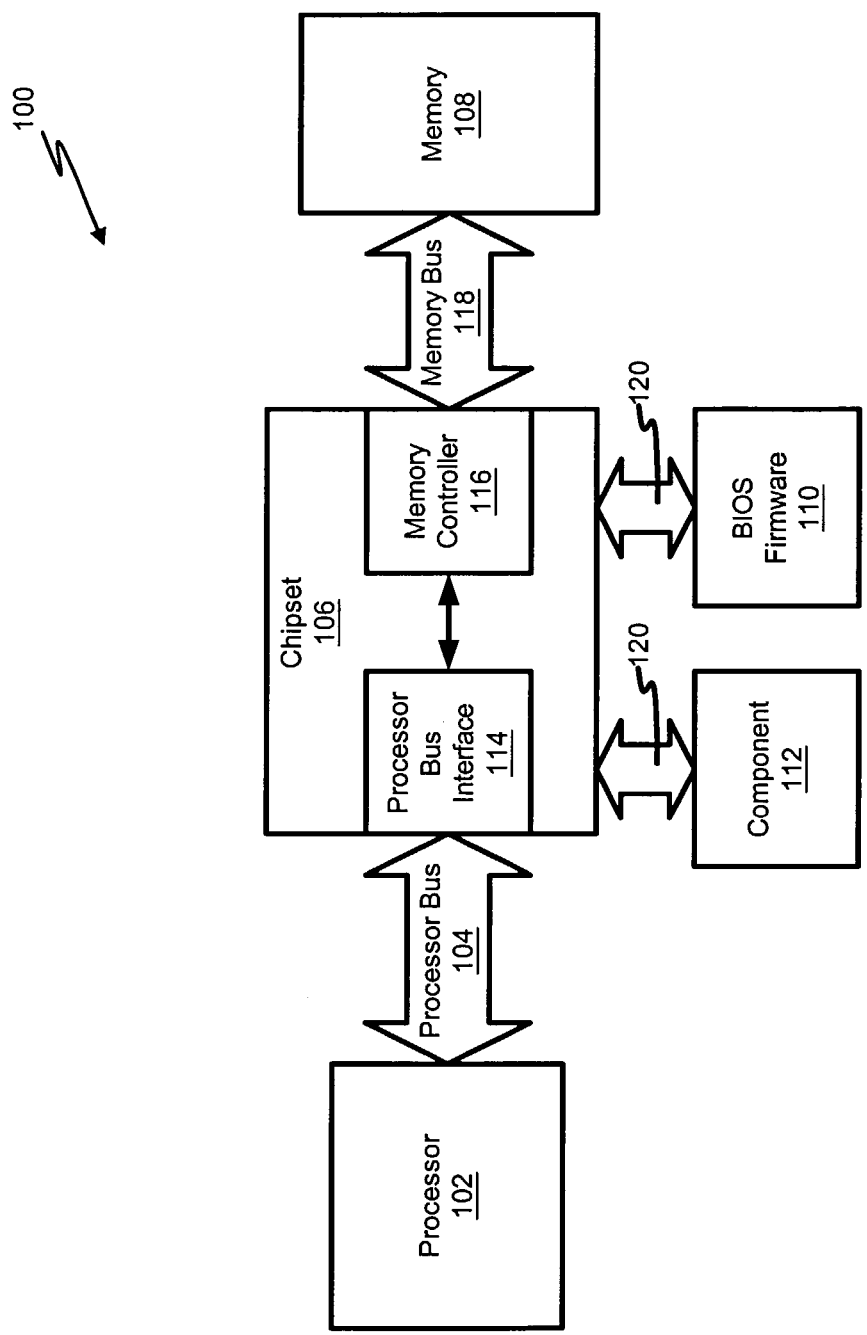
FIG. 1 illustrates an embodiment of a computing device.

An example embodiment of a computing device 100 is shown in FIG. 1. The computing device 100 may comprise one or more processors 102. The processors 102 may perform actions in response to executing instructions. For example, the processors 102 may issue transactions such as memory read transactions and memory write transactions on a processor bus 104.

The computing device 100 may further comprise a chipset 106. The chipset 106 may comprise one or more integrated circuit packages or chips that couple the processors 102 to memory 108, Basic Input/Output System (BIOS) firmware 110 and other components 112 (e.g. a mouse, keyboard, video controller, hard disk, floppy disk, etc.). The chipset 106 may comprise a processor bus interface 114 to receive transactions from the processors 102 and to issue transactions to the processors 102 via the processor bus 104. The chipset 106 may further comprise a memory controller 116 to issue read and write transactions to the memory 108 via a memory bus 118. The chipset 106 may further comprise one or more component interfaces (not shown) to access the other components 112 via buses 120 such as, for example, peripheral component interconnect (PCI) buses, accelerated graphics port (AGP) buses, universal serial bus (USB) buses, low pin count (LPC) buses, and/or other I/O buses.

In one embodiment, the BIOS firmware 110 comprises routines which the computing device 100 may execute during system startup in order to initialize the processors 102, chipset 106, and other components of the computing device 100. Moreover, the BIOS firmware 110 may comprise routines or drivers which the computing device 100 may execute to communicate with one or more components of the computing device 100.

The memory 108 may comprise memory devices providing addressable storage locations that the memory controller 116 may read data from and/or write data to. The memory 108 may comprise one or more different types of memory devices such as, for example, dynamic random access memory (DRAM) devices, synchronous dynamic random access memory (SDRAM) devices, double data rate (DDR) SDRAM devices, quad data rate (QDR) SDRAM devices, or other volatile or non-volatile memory devices. Moreover, the memory 108 may be arranged in a hierarchal manner. For example, the memory 108 may be arranged in channels, ranks, banks, pages, and columns.

Figure 2:
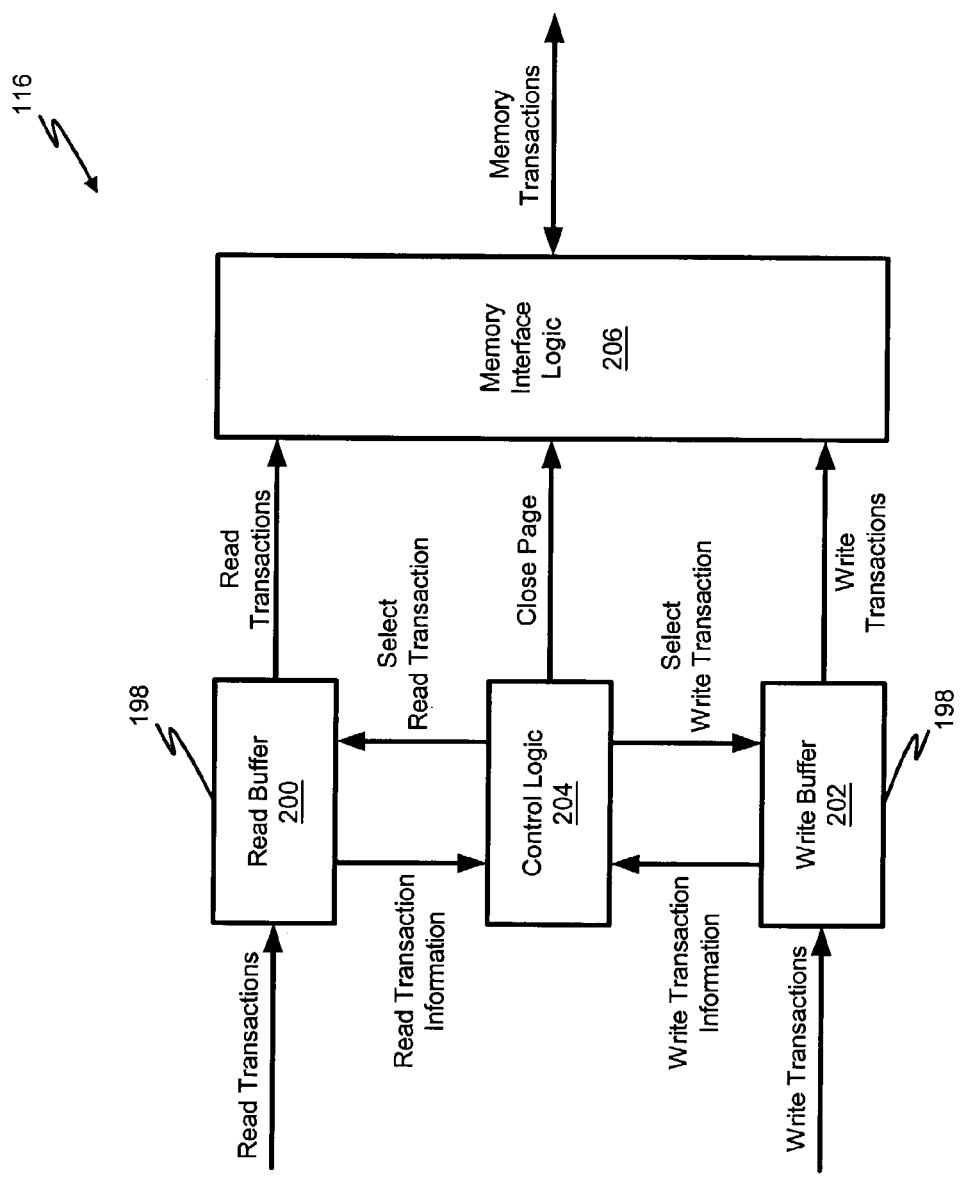
FIG. 2 illustrates an embodiment of a memory controller of the computing device of FIG. 1.

As depicted in FIG. 2, the memory controller 116 may comprise a write-cache 198 that comprises a read buffer 200 and a write buffer 202. The memory controller 116 may further comprise control logic 204 and a memory interface 206. The read buffer 200 may buffer the address and data of a read transaction until the requested data is retrieved from the memory 108 and returned to the requester (e.g. processor 102). Similarly, the write buffer 202 may buffer the address and data of a write transaction until the data is written to the memory 108. The read buffer 200 and write buffer 202 may each support buffering of one or more transactions.

The control logic 204 may select a transaction from the buffers 200, 202 based upon various criteria and may request the memory interface 206 to service the selected transaction. Computer performance is typically more dependent upon memory read performance than memory write performance. Accordingly, the control logic 204 in one embodiment in general favors read transactions over write transactions and thus generally causes write transactions to wait until the read buffer is empty. In another embodiment, the control logic 204 may further wait until data needs to be evicted from the write-cache 198 before writing data of the write buffer 202 back to the memory 108.

The control logic 204, however, may select write transactions over read transactions under certain conditions such as, for example, the write buffer 202 becoming full or the number of pending write transactions in the write buffer 202 having a predetermined relationship to an upper threshold that indicates that the write buffer 202 is nearly full. In which case, the control logic 204 may completely flush the write buffer thus presenting all pending write transactions to memory interface 206 for servicing. The control logic 204 may alternatively partially flush the write buffer 202. For example, the control logic 204 may present the memory interface 206 with a predetermined number of write transactions (e.g. 4) or may present the memory interface 206 with write transactions from the write buffer 202 until the number of pending write transactions has a predetermined relationship with a lower threshold.

The control logic 204 may further satisfy a read transaction with data stored in the write cache 198. Satisfying the read transaction with data from the write buffer 202 may reduce the latency of the read transactions since the memory controller 116 is able to satisfy the request without retrieving the data from memory 108. Further, servicing read transactions with cached data of the write buffer 202 may help reduce the latency of other read transactions due to fewer read transactions consuming bandwidth between the memory controller 116 and the memory 108. Furthermore, the control logic 204 may combine, in the write buffer 202, data of write transactions that target the same locations of the memory 108. Again, combining write transactions in the write buffer 202 may reduce the latency of memory transactions since write combining may reduce the number of write transactions between the memory controller 116 and the memory 108.

The memory interface 206 may read data from memory 108 in response to read transactions and may write data to memory 108 in response to write transactions. In particular, the memory interface 206 may decode an address of a transaction and may apply memory select signals to the memory in order to open pages of the memory 108 for reading and/or writing. Moreover, the memory interface 208 may close an opened page by issuing a precharge command or by issuing a transaction to the memory 108 with an auto-precharge qualifier that causes the memory 108 to close the page of the transaction after servicing the transaction.

As indicated above, the control logic 204 favors read transactions over write transactions. Accordingly, write transactions tend to be interspersed between read transactions that were issued by the processor 102 considerably after the write transactions. Read transactions in such an environment tend to exhibit poor spatial locality of reference to the write transactions due to their temporal separation. If pages accessed by write transactions are left open, then read transactions that follow the last write transactions of write transaction series tend to result in a higher proportion of page-miss accesses to page-hit access. In an effort to reduce overall memory latency, the control logic 204 in one embodiment closes a page accessed by a last write transaction to reduce the likelihood that a read transaction following the last write transaction results in a page-miss access. As stated previously, a page-empty access has about twice the latency of a page-hit access, but a page-miss access has about thrice the latency of a page-hit access. Therefore, if leaving the page accessed by the last write transaction of one or more consecutive write transactions would result in more page-miss accesses than page-hit access, then closing the page would reduce the latency of read transactions following write transactions.

Figure 3:
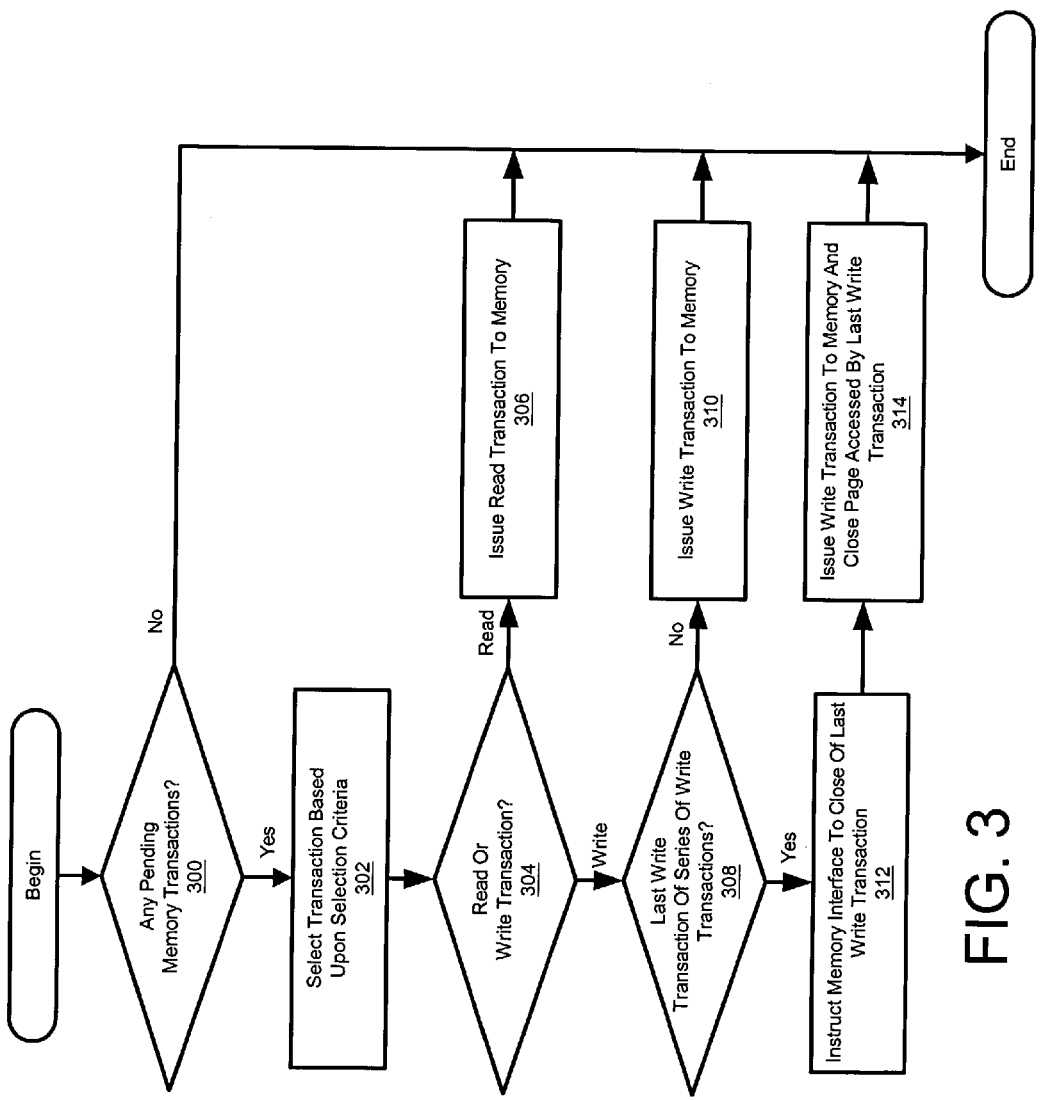
FIG. 3 illustrates an embodiment of a method that may be used by the memory controller of FIG. 2 to schedule transactions and close pages of the memory.

Therefore, as shown in FIG. 3, the memory controller 116 in an attempt to reduce memory latency may schedule transactions and close pages in a manner that attempts to reduce overall memory latency experienced by the processor 102. The method of FIG. 3 in general favors read transactions over write transactions and generally closes pages of a memory 108 that were accessed by the last write transactions of a series of one or more write transactions. However, the memory controller 116 may close pages of the memory 108 based upon additional criteria.

In response to determining that there is an available time slot for issuing a memory transaction, the control logic 204 in block 300 may determine whether there are any pending memory transactions. In particular, the control logic 204 may determine that there are no pending memory transactions if neither the read buffer 200 nor the write buffer 202 comprises transactions to be issued to the memory 108. In response to determining there are no pending transactions, the control logic 204 may enter an idle state or exit the scheduling method of FIG. 3 until the next available time slot for issuing a memory transaction.

Otherwise, the control logic 204 in block 302 may select a transaction from the read buffer 200 or the write buffer 202 based upon selection criteria or rules. For example, in one embodiment, the control logic 204 may favor read transaction over write transactions and may select a read transaction if the read buffer 200 comprises a read transaction. In response to the read buffer 200 comprising no read transactions to be issued to the memory 108, the control logic 204 may select a write transaction from the write buffer 202. In another embodiment, the control logic 204 may further select a write transaction from the write buffer 202 even though the read buffer 200 comprises pending read transactions. In particular, the control logic 204 may select a write transaction in response to determining that the write buffer 202 is full or in response to determining that the write buffer 202 comprises an upper threshold of write transactions that indicates the write buffer 202 is nearly full. In yet another embodiment, after detecting that the write buffer 202 is full or nearly full, the control logic 204 may continue to select write transactions over read transactions until a predetermined number (e.g. 4) of write transactions have been selected, until the write buffer 202 is empty, or until the write buffer 202 comprises a lower threshold of write transactions. For example, the lower threshold may correspond to the write buffer 202 being half filled.

In block 304, the control logic 204 may determine whether the selected transaction is a read transaction or a write transaction. In response to determining that the selected transaction is a read transaction, the control logic 204 in block 306 may cause the memory interface 206 to issue the selected read transaction to the memory to obtain the requested data from the memory 108. Otherwise, the control logic 204 in block 308 may determine whether the selected write transaction is the last write transaction of a series of one or more write transactions. For example, in one embodiment, the control logic 204 may determine that selected write transaction is the last write transaction in response to determining that the write buffer 202 comprises no other pending transactions. In another embodiment, the control logic 204 may further determine that the selected write transaction is the last write transaction in response to determining that the read buffer 200 comprises at least one read transaction to issue to the memory 108. The control logic 204 may further determine that the selected write transaction is the last write transaction of the series in response to determining that the write buffer comprises no more write transactions to the page of memory 108 to be accessed by the selected write transaction. The control logic 204 may also determine that the select write transaction is the last write transaction in response to memory interface 206 issuing a predetermined number of consecutive write transactions to the memory 108. Further yet, the control logic 204 may determine that the selected write transaction is the last write transaction of the series in response to determining that write buffer 202 comprises a lower threshold of write transactions. It should be appreciated that the control logic 204 may determine the last write transaction of a series of one or more write transactions based upon one or more of the above identified criteria and/or other criteria.

In response to determining that the selected write transaction is not the last write transaction of a series of write transactions, the control logic 204 in block 310 may cause the memory interface 206 to issue the selected write transaction to the memory 108 in order to write the data supplied by the write transaction to the memory 108. Otherwise, the control logic 204 in block 312 may instruct the memory interface 206 to close a page accessed by the write transaction.

In response to being instructed to close the page accessed by the write transaction, the memory interface 206 in block 314 may issue the selected write transaction to the memory 108 and may close the page accessed by the write transaction. In one embodiment, the memory interface 206 may issue the write transaction to the memory 108 and then may issue a precharge command to the memory 108 to close the page after the write transaction. In another embodiment, the memory interface 206 may issue the write transaction to the memory 108 with an auto-precharge qualifier that causes the memory 108 to close the page accessed by the write transaction after the data of the write transaction is written to the page.

The computing device 100 may perform all or a subset of the example method in response to executing instructions of a machine readable medium such as, for example, read only memory (ROM); random access memory (RAM); magnetic disk storage media; optical storage media; flash memory devices; and/or electrical, optical, acoustical or other form of propagated signals such as, for example, carrier waves, infra-red signals, digital signals, analog signals. Furthermore, while the example method is illustrated as a sequence of operations, the computing device 100 in some embodiments may perform operations of the method in parallel or in a different order.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
   detecting a last write of a series of writes to a memory, wherein the last write is detected in response to determining that a number of pending writes has a predetermined relationship to a lower threshold, and
   closing a page of the memory in response to detecting the last write to the memory.

2. The method of claim 1 wherein the last write is detected in response to determining that a write buffer is empty.

3. The method of claim 1 wherein the last write is detected in response to determining that a read to the memory is pending.

4. The method of claim 1 wherein closing comprises issuing a command to the memory that closes the page.

5. The method of claim 1 wherein closing comprises issuing the last write to the memory with a qualifier that causes the memory to close the page.

6. A method comprising
   detecting a last write to a page of memory, and
   closing the page of the memory in response to detecting the last write to the page of memory, wherein closing comprises issuing the last write to the memory with a qualifier that causes the memory to close the page after the last write.

7. The method of claim 6 wherein the last write is detected in response to determining that the write buffer is empty.

8. The method of claim 6 wherein the last write is detected in response to determining that a read to the memory is pending.

9. The method of claim 6 wherein the last write is detected in response to determining that a number of pending writes has a predetermined relationship to a lower threshold.

10. The method of claim 6 wherein the last write is detected in response to determining that a number of pending writes to the page of memory has a predetermined relationship to a lower threshold.

11. The method of claim 6 wherein closing comprises issuing a command to the memory that closes the page.

12. A memory controller comprising
a read buffer to store read transactions to be issued to a memory,
a write buffer to store write transactions to be issued to the memory,
a memory interface to issue read transactions and write transactions to the memory and to close a page of the memory that was accessed by a last write transaction of a series of write transactions, and
control logic to select transactions from the read buffer and the write buffer based upon selection criteria, to cause the memory interface to issue the selected transactions, and to instruct the memory interface to close the page accessed by the last write transaction of the series in response to detecting the last write transaction of the series.

13. The memory controller of claim 12 wherein the control logic determines that a write transaction is the last write transaction of the series in response to determining that a write buffer is empty.

14. The memory controller of claim 12 wherein the control logic determines that a write transaction is the last write transaction of the series in response to determining that the read buffer comprises at least one read transaction.

15. The memory controller of claim 12 wherein the control logic determines that a write transaction is the last write transaction of the series in response to determining that the write buffer comprises a lower threshold of write transactions to the memory.

16. The memory controller of claim 12 wherein the control logic determines that a write transaction is the last write transaction of the series in response to determining that the write buffer comprises a lower threshold of write transactions to the page of memory.

17. The memory controller of claim 12 wherein the control logic determines that a write transaction is the last write transaction of the series in response to determining that the write buffer comprises no write transactions to the page of memory.

18. The memory controller of claim 12 wherein the memory interface is to issue a command to the memory to close page accessed by the last write transaction of the series.

19. The memory controller of claim 12 wherein the memory interface is issue the last write transaction to the memory with a qualifier that causes the memory to close the page accessed by the last write transaction.

20. A system comprising
volatile random access memory,
a processor to issue read transactions and write transactions, and
a memory controller to buffer the read transactions and the write transactions issued by the processor, to issue the read transactions and write transactions to the volatile random access memory based upon selection criteria, and to close a page accessed by a last write transaction of a series of write transactions.

21. The system of claim 20 wherein the memory controller detects the last write in response to determining that no write transactions are buffered.

22. The system of claim 20 wherein the memory controller detects the last write in response to determining that at least one read transaction is pending.

23. The system of claim 20 wherein the memory controller detects the last write in response to determining that the memory controller has a lower threshold of write transactions buffered.

24. The system of claim 20 wherein the memory controller detects the last write in response to determining that the memory controller has a lower threshold of write transactions to the page buffered.

25. The system of claim 20 wherein the memory controller issues a precharge command to the memory to close the page accessed by the last write transaction.

26. The system of claim 20 wherein the memory controller issues the last write to the memory with an auto-precharge qualifier to cause the memory to close the page accessed by the last write.

27. A computer readable medium comprising a plurality of instructions that in response to being executed result in a computing device
detecting a last write of a series writes to the memory, and
signaling that a page of the memory is to be closed in response to detecting the last write to the memory,
wherein the plurality of instructions further result in the computing device determining that a write of the series of writes is the last write of the series in response to determining that a number of pending writes has a predetermined relationship to a lower threshold.

28. The computer readable medium of claim 27 wherein the plurality of instructions further result in the computing device determining that a write of the series of writes is the last write of the series in response to determining that a write buffer is empty.

29. The computer readable medium of claim 27 wherein the plurality of instructions further result in the computing device determining that a write of the series of writes is the last write of the series in response to determining that a read to the memory is pending.

* * * * *